US 8,165,369 B2

(12) United States Patent
Kubota et al.

(10) Patent No.: US 8,165,369 B2
(45) Date of Patent: Apr. 24, 2012

(54) SYSTEM AND METHOD FOR ROBUST SEGMENTATION OF PULMONARY NODULES OF VARIOUS DENSITIES

(75) Inventors: Toshiro Kubota, Lewisburg, PA (US); Anna Jerebko, West Chester, PA (US); Marcos Salganicoff, Bala Cynwyd, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 800 days.

(21) Appl. No.: 12/243,387

(22) Filed: Oct. 1, 2008

(65) Prior Publication Data

US 2009/0092302 A1 Apr. 9, 2009

Related U.S. Application Data

(60) Provisional application No. 60/977,123, filed on Oct. 3, 2007.

(51) Int. Cl.
G06K 9/00 (2006.01)

(52) U.S. Cl. ....................................................... 382/128
(58) Field of Classification Search .................. None
See application file for complete search history.

(56) References Cited

U.S. PATENT DOCUMENTS

| | | | | |
|---|---|---|---|---|
| 6,728,334 B1 * | 4/2004 | Zhao | | 382/131 |
| 6,891,964 B2 * | 5/2005 | Doi et al. | | 382/131 |
| 7,590,273 B2 * | 9/2009 | Kubota et al. | | 382/131 |
| 7,711,172 B2 * | 5/2010 | Kubota | | 382/131 |
| 7,720,271 B2 * | 5/2010 | Kubota | | 382/131 |
| 7,773,791 B2 * | 8/2010 | Simon et al. | | 382/128 |
| 2003/0048936 A1 * | 3/2003 | Fan et al. | | 382/131 |
| 2003/0099387 A1 * | 5/2003 | Doi et al. | | 382/131 |
| 2003/0099391 A1 * | 5/2003 | Bansal et al. | | 382/131 |
| 2005/0063579 A1 * | 3/2005 | Lee et al. | | 382/131 |
| 2005/0259855 A1 | 11/2005 | Dehmeshki | | |
| 2007/0086637 A1 | 4/2007 | Zhang | | |
| 2007/0223807 A1 * | 9/2007 | Yankelevitz et al. | | 382/159 |
| 2008/0137921 A1 * | 6/2008 | Simon et al. | | 382/128 |
| 2008/0187204 A1 * | 8/2008 | Reeves et al. | | 382/131 |
| 2009/0129673 A1 * | 5/2009 | Simon et al. | | 382/173 |
| 2009/0252395 A1 * | 10/2009 | Chan et al. | | 382/131 |
| 2010/0272341 A1 * | 10/2010 | Reeves et al. | | 382/131 |
| 2011/0075920 A1 * | 3/2011 | Wu et al. | | 382/160 |

OTHER PUBLICATIONS

Salganicoff et al., "A segmentation algorithm with competition-diffusion and distancetransform for automated estimate of pulmonary nodule diameter", CARS. Computer Assisted Radiology and Surgery, Proceedings of the International Congress and Exhibition, Proceedings of the International Symposium on Computer Assisted Radiology and Surgery, vol. 2, No. Suppl. 1, Jun. 1, 2007, pp. S364-S366.

* cited by examiner

Primary Examiner — Jermele M Hollington
(74) Attorney, Agent, or Firm — Peter Withstandley

(57) ABSTRACT

A method for differentiating pulmonary nodules in digitized medical images includes identifying an object of interest from a digital image of the lungs, computing a first distance map of each point of the object of interest, determining a seed point from the first distance map, starting from the seed point, growing a first region by adding successive adjacent layers of points until a background point is reached, and partitioning the first region into a nodule region and a non-nodule region.

20 Claims, 4 Drawing Sheets

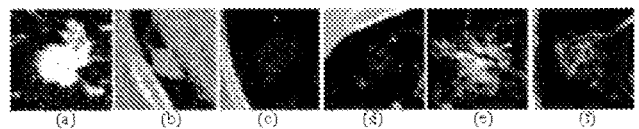

Fig. 1. Examples of pulmonary nodules of various densities.

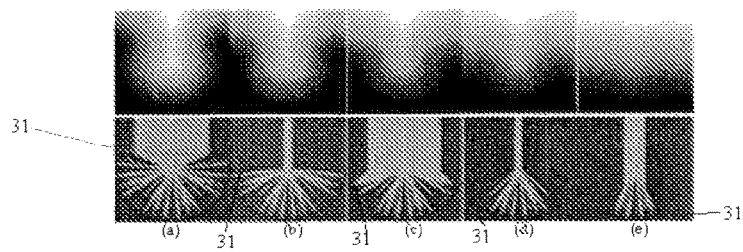

Fig. 3. Distance (top) and sphericity (bottom) maps at various degrees of occlusion.

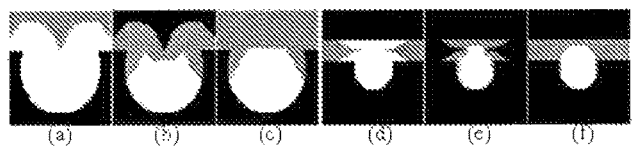

Fig. 4. Segmentation of simple artificial data.

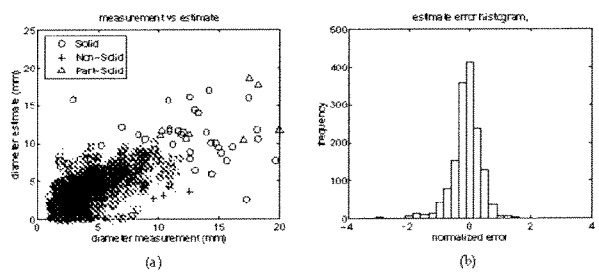

Fig. 6. Diameter measurement results on 1521 nodule data.

Fig. 7. Descriptive statistics of the diameter measurement experiment

|           | $\rho$ | $\mu$ | $m$   | $\sigma$ | $\tau$ |
|-----------|--------|-------|-------|----------|--------|
| All       | 0.755  | 0.359 | 0.254 | 0.397    | 0.607  |
| Solid     | 0.759  | 0.372 | 0.256 | 0.422    | 0.603  |
| Non-solid | 0.624  | 0.334 | 0.285 | 0.266    | 0.611  |
| Part-solid| 0.864  | 0.214 | 0.177 | 0.163    | 0.664  |

$\rho$: Pearson correlation coefficient.
$\mu$: mean normalized absolute error.
$m$: median normalized absolute error.
$\sigma$: std normalized absolute error
$\tau$: mean computation time (sec) on 2.8GHz PC with 1G memory

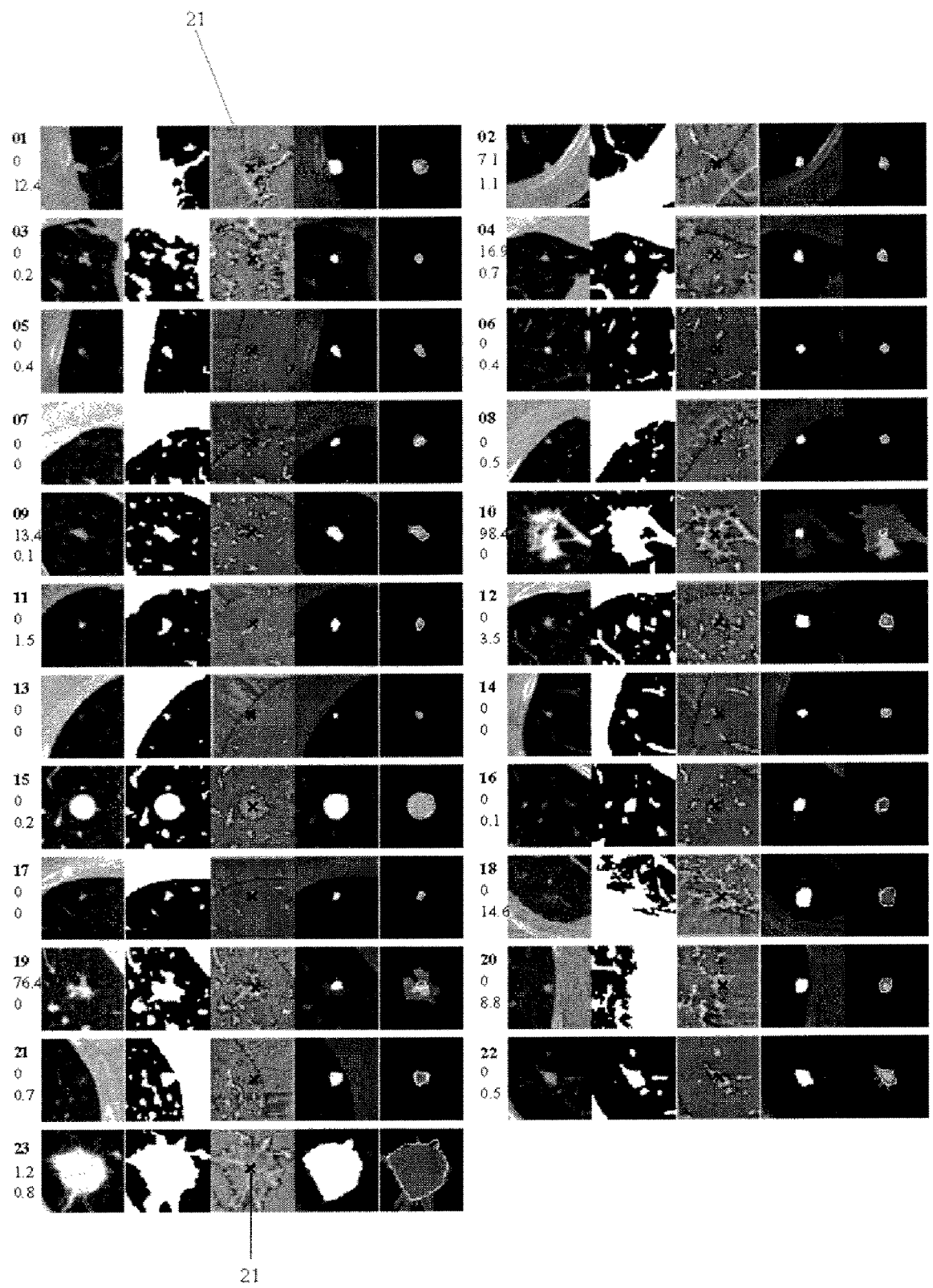
Fig. 2. Segmentation results on LIDC data set.

SYSTEM AND METHOD FOR ROBUST SEGMENTATION OF PULMONARY NODULES OF VARIOUS DENSITIES

CROSS REFERENCE TO RELATED UNITED STATES APPLICATIONS

This application claims priority from "Automatic Algorithm For Lung Nodule Density Differentiation" U.S. Provisional Application No. 60/977,123 of Kubota, et al., filed Oct. 3, 2007, the contents of which are herein incorporated by reference in their entirety.

TECHNICAL FIELD

This disclosure is directed to segmentation of lung nodules in digitized medical images.

DISCUSSION OF THE RELATED ART

Pulmonary nodules are potential manifestations of lung cancer, and their detection and inspection are essential for screening and diagnosis of the disease. The growth of a nodule is considered the most important cue for assessing its malignancy. Thus, accurate segmentation of pulmonary nodules is an important and active area of research in medical image processing.

Various segmentation methods targeted for pulmonary nodules have been developed, and some have been deployed in commercial applications, but those that are applicable to various density types have not been available until recently. Many technical issues remain, including accuracy and handling of non-solid and part-solid nodules. Most existing segmentation algorithms are targeted toward nodules composed only of solid components, although studies have shown that nodules of non-solid and part-solid types are frequent and have higher risks of being malignant than solid nodules. More recent segmentation methods reported in literature claim to handle these types of nodules, however, the field is relatively new and requires further investigation.

FIGS. 1(a)-(e) depicts examples of pulmonary nodules of various densities, with solid nodules in FIGS. 1(a)-(b), non-solid nodules, shown in FIGS. 1(c)-(d), and part-solid nodules shown in FIGS. 1(e)-(f). As shown in the figures, the appearance varies among different nodule types. In particular, non-solid nodules are subtle with fuzzy boundaries, and part-solid nodules exhibit highly irregular intensity variations and boundary shapes. Thus, handling them under a single framework presents a challenge to the segmentation task. The inputs to the segmentation are a thin-slice thoracic CT volume and a click point. The output is a segmentation map of a nodule found in the vicinity of the click point.

SUMMARY OF THE INVENTION

Exemplary embodiments of the invention as described herein generally include methods and systems for a new semi-automated general purpose segmentation algorithm for a pulmonary nodule. An algorithm according to an embodiment of the invention is applicable to solid, non-solid and part-solid types and solitary, vascularized, and juxtapleural types without having the lung separated from the pleural walls. An algorithm according to an embodiment of the invention assumes that the nodule is convex, and works on a distance map computed from a foreground image. It first locates the core of a nodule using a new approach that is highly robust against the presence of attached structures such as pleura and vessels and is invariant to the size of the nodule. The task of segmenting a juxtapleural nodule involves detecting a boundary between the nodule and the lung wall. This task can be addressed in two steps: locating the core of the nodule and growing a region from the core. Insensitivity to attached structures helps achieve the first step. Many previous techniques search both location and size of a nodule either in iterative manners or in scale-space representations. The size-invariance property of an algorithm according to an embodiment of the invention makes it unnecessary to estimate the size of the nodule, thus renders the localization process computationally more efficient Second, an algorithm according to an embodiment of the invention employs a two-step region growing process that detaches the nodule from the attached structures by a variant of region growing and region partition, where a first step over-segments the nodule and a second step refines the segmentation via a competition process The approach extracts a convex nodule from attached structures such as lung walls and vessels.

Performance is evaluated using NIH Lung Image Database Consortium (LIDC) data set containing 23 nodules with manual segmentation and a larger dataset containing 1521 nodules with manual diameter measurements. The experiments show that an algorithm according to an embodiment of the invention is highly reliable in segmenting convex nodules of various types.

A limitation of the approach is that it cannot handle spiculated nodules due to the underlying assumption of nodule convexity. Another limitation is that it tends to over-segment non-solid nodules. The limitation can be circumvented by referring to the ROI intensity volume and carefully trimming voxels that are likely to be partial volumes.

According to an aspect of the invention, there is provided a method for differentiating pulmonary nodules in digitized medical images, the method including identifying an object of interest from a digital image of the lungs, computing a first distance map of each point of the object of interest, determining a seed point from the first distance map, starting from the seed point, growing a first region by adding successive adjacent layers of points until a background point is reached, and partitioning the first region into a nodule region and a non-nodule region.

According to a further aspect of the invention, computing a first distance map comprises producing a binary map from the digital image where points in a foreground of the object of interest have value 1 and all other points have value 0, and determining a distance from each foreground point to a nearest background point.

According to a further aspect of the invention, determining a seed point from the first distance map comprises calculating a sphericity of each point in the first distance map, and selecting as the seed point a local maximum point of the sphericity, where the sphericity at a point x is defined as $$S(x) = \int_{y \in N(x)} \chi(D(x) - D(y)) dy,$$

where $D(x)$ is the first distance map for point x, $N(x)$ is a ball of radius $\delta$ centered at x and $\lambda(x)=1$ if $x>0$ and 0 otherwise.

According to a further aspect of the invention, the method includes resampling the object of interest at a fixed interval to produce an isotropic sub-volume.

According to a further aspect of the invention, partitioning the first region into comprises, computing a second distance map of each point in the first region, relocating the seed point to a local maximum of the second distance map, and finding all local maxima about the relocated seed point, growing a second region about each local maxima in a down-hill direction, and identifying each second region as a nodule or a non-nodule.

According to a further aspect of the invention, those local maxima within a predetermined distance of the relocated seed point are labeled as positive, and all other local maxima are labeled negative, where those points attached to a second region grown from a positive local maximum are labeled as positive, those points attached to a second region grown from a negative local maximum are labeled as negative, the second region is grown until all points in the second distance map are labeled as positive or negative, and where each set of positive points is identified as a nodule, and each set of negative points is identified as a non-nodule.

According to a further aspect of the invention, the method includes forming a convex hull of the nodule, and calculating an intersection of the convex hull with a foreground of the object of interest.

According to another aspect of the invention, there is provided a method for differentiating pulmonary nodules in digitized medical images that includes growing a first region about a seed point in an object of interest in a digital medical image, determining a second seed point in the first region, and finding all local maxima about the second seed point, labeling those local maxima within a predetermined distance of the second seed point as positive, and labeling all other local maxima as negative, growing a second region about each local maxima in a down-hill direction, where those points attached to a second region grown from a positive local maximum are labeled as positive, those points attached to a second region grown from a negative local maximum are labeled as negative, the second region is grown until all points in the first region are labeled as positive or negative, and identifying each set of positive points as a nodule, and each set of negative points as a non-nodule.

According to a further aspect of the invention, growing a first region comprises identifying a object of interest in the digital image of the lungs, determining a first seed point in the object of interest, and starting from the first seed point, growing a first region by adding successive adjacent layers of points until a point outside of the object of interest is reached.

According to a further aspect of the invention, determining a first seed point comprises producing a binary map from the digital image where points in a foreground of the object of interest have value 1 and all other points have value 0, determining a distance from each foreground point to a nearest background point, calculating a sphericity of each point in the first distance map, where the sphericity at a point x is defined as $$S(x) = \int_{y \in N(x)} \chi(D(x) - D(y)) dy,$$

where $D(x)$ is the first distance map for point x, $N(x)$ is a ball of radius $\delta$ centered at x and $\lambda(x)=1$ if $x>0$ and 0 otherwise, and selecting as the seed point a local maximum point of the sphericity.

According to a further aspect of the invention, determining a second seed point comprises computing a second distance map of each point in the first region and relocating the seed point to a local maximum of the second distance map by tracing a gradient of the second distance map.

According to a further aspect of the invention, the second region is grown until all points in second distance map are labeled as positive or negative.

According to a further aspect of the invention, a point x attached to the second region has a neighbor point y with a same label and where a second distance map value of x is less than or equal to a second distance map value of y.

According to another aspect of the invention, there is provided a program storage device readable by a computer, tangibly embodying a program of instructions executable by the computer to perform the method steps for differentiating pulmonary nodules in digitized medical images.

BRIEF DESCRIPTION OF THE DRAWINGS

FIGS. 1(a)-(f) show examples of pulmonary nodules of various densities, according to an embodiment of the invention.

FIG. 2 shows segmentation results on the LIDC data set, according to an embodiment of the invention.

FIGS. 3(a)-(e) shows distance and sphericity maps at various degrees of occlusion, according to an embodiment of the invention.

FIGS. 4(a)-(f) illustrates the segmentation of simple artificial data, according to an embodiment of the invention.

FIG. 6 depicts diameter measurement results on 1521 nodule data, according to an embodiment of the invention.

FIG. 7 is a table of descriptive statistics of the diameter measurement experiment, according to an embodiment of the invention.

DETAILED DESCRIPTION OF EXEMPLARY EMBODIMENTS

Figure 5:
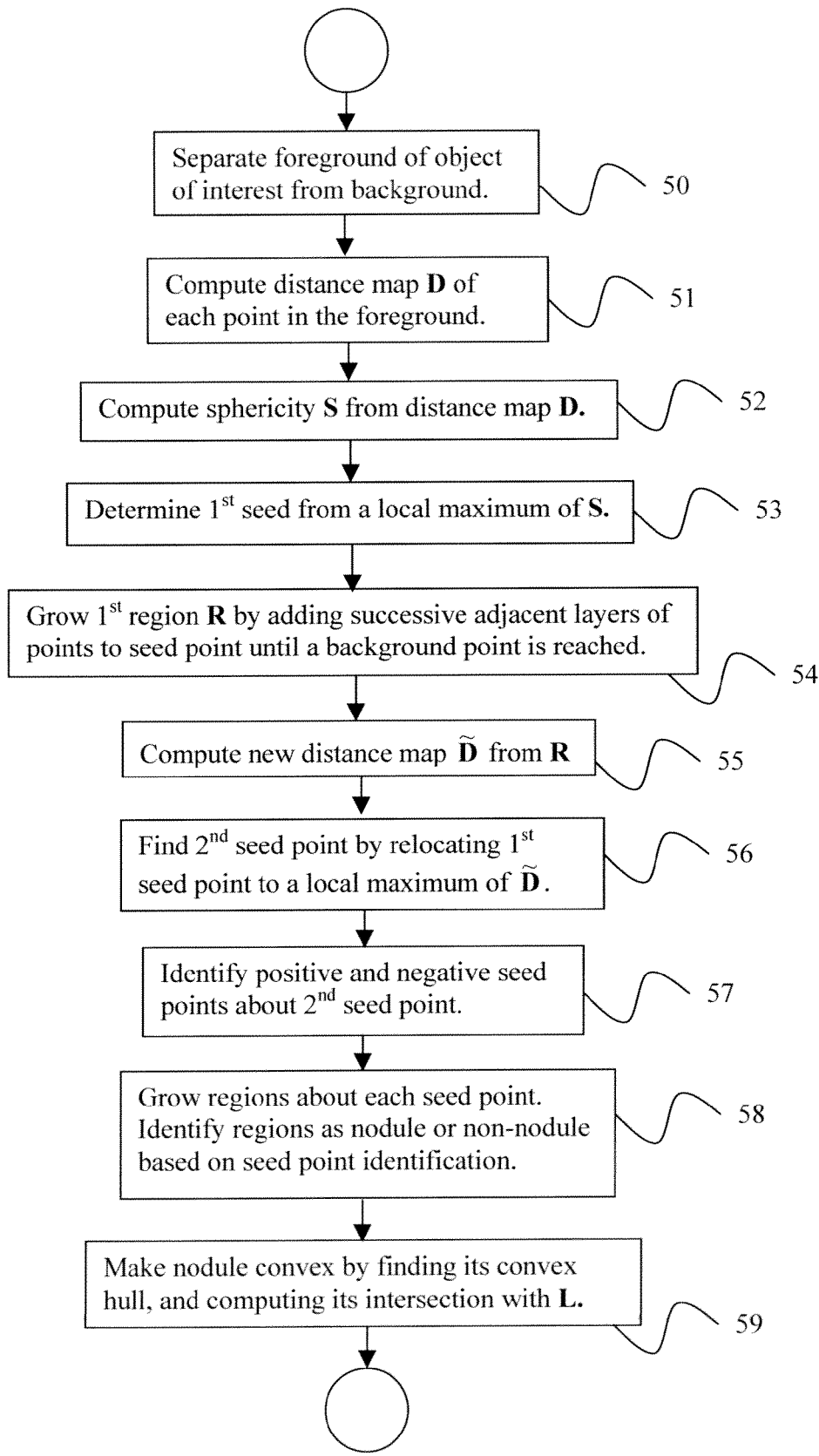
FIG. 5 is a flowchart of a method for lung nodule density differentiation, according to an embodiment of the invention.

Exemplary embodiments of the invention as described herein generally include systems and methods for lung nodule density differentiation. Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

As used herein, the term "image" refers to multi-dimensional data composed of discrete image elements (e.g., pixels for 2-D images and voxels for 3-D images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to R, the methods of the inventions are not limited to such images, and can be applied to images of any dimension, e.g., a 2-D picture or a 3-D volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

Notation

A lower bold letter (x) is used for a vector, an upper bold letter (X) is used for a 3D volume, and a non-bold letter (x) is used for a scalar. Without ambiguity, an upper bold letter is associated with a binary volume (e.g. a segmented volume) to indicate those voxels whose binary values are non-zero. For example, L is used to denote a set of voxels that are foreground. Furthermore, ¬L is used to denote those voxels whose binary values are zero in L.

Overview

A segmentation algorithm according to an embodiment of the invention includes six stages: pre-processing, figure-ground separation, localization of a nodule core, region growing, region partition, and post-processing. The first two stages are briefly discussed in this section. The other four are discussed, respectively, in the following sub-sections.

During pre-processing, a sub-volume that is large enough to contain a nodule of interest is extracted. The sub-volume is then resampled at a fixed interval to produce an isotropic sub-volume, called a region of interest (ROI). Denote a set of voxels in ROI as $\Omega$. The figure-ground separation applies a bi-class segmentation algorithm to the ROI, resulting in a binary map denoted as $L:\Omega \rightarrow \{0,1\}$, where the 0 and 1 voxels indicate backgrounds and foregrounds, respectively. An exemplary, non-limiting bi-class segmentation algorithm uses a reaction-diffusion segmentation to extract bright regions with an initial transform of voxel data into a probabilistic quantity. The transform is performed twice: once for targeting solid nodules and second for non-solid ones. Letting f denote an HU value offset by 1024 to be in a range of 0 to 4095, and g and h denote the transformed values after the voxel-wise transformation, respectively. For solid nodules, each voxel value undergoes the following transformations (g and h) for solid and non-solid cases, respectively:

$$g = \begin{cases} f/1000 & 0 \le f \le 1000 \\ 1 & f > 1000 \end{cases}, \text{ and}$$

$$h = \begin{cases} \dfrac{f-200}{400} & 100 \le f \le 500 \\ \dfrac{900-f}{500} & 500 \le f \le 1000 \\ 0 & \text{otherwise.} \end{cases}$$

The particular numeric values used here are exemplary and non-limiting, and other values are within the scope of other embodiments of the invention.

FIG. 2 shows results of the figure-ground separation process applied to 23 data sets provided by the NIH Lung Imaging Database Consortium (LIDC). For each data, five images are shown. The left image is a representative axial slice of the nodule in the original CT data. The second image from the left is the result of the figure-ground separation. The other three images are results of seed point localization and segmentation processes: the sphericity map, the segmentation result, and a comparison with manual segmentation. In the rightmost image, a dark gray color shows the area selected by at least one segmentation, a light gray color shows the area selected by 90% of the methods, and a white line shows the boundary of a segmentation result of an algorithm according to an embodiment of the invention. If no light gray area is shown, the slice did not contain an area agreed by 90% of the methods. Three numbers on the side of each image set are a unique identification number, the under-segmentation fraction percentage, and the over-segmentation fraction percentage. Accuracy measures will be described below. Note that the images are shown at the resolution of the original CT data. Thus, all results shown are interpolated back to the resolution of the original CT data.

Localization of Nodule Center

After the figure-ground separation, a next task is to locate a core of a nodule inside the ROI. One first applies a Euclidean distance transform to L to compute for each location in L the shortest Euclidean distance to the background. Call the resulting distance map D. Note that D is free from signal noise present in the original intensity volume. Thus, no noise removal or signal restoration processes are needed in the subsequent processes. Furthermore, processing D renders the rest of the algorithm insensitive to intensity variations of the images. This is useful as solid, non-solid and part-solid nodules present different intensity distributions. In addition, D compactly encodes information regarding the shape of the foreground. For example, D tells how close each voxel is to the background. It provides, by means of a gradient vector computed on D, a rough direction to the background.

A limitation of D is that it is sensitive to a small hole present in the foreground and partially sensitive to an attached structure. The foreground extraction procedure described above effectively removes small holes in L. How to handle the attachment will be discussed next.

When a nodule is modeled as a sphere and more than a half of the nodule is buried in the lung wall, the local maximum of D no longer resides inside the nodule. To mitigate this effect, another transformation can be built on top of D as defined below:

$$S(x) = \int_{y \in N(x)} \chi(D(x) - D(y)) dy, \tag{1}$$

where N(x) is a ball of radius δ centered at x and λ(x)=1 if x>0 and 0 otherwise. S is referred to as sphericity.

It is convenient to introduce a level core of D at d, denoted as C(d), defined as follows:

$$C(d) = \{x \in \Omega | D(x) < d\}. \tag{2}$$

The next lemmas indicate that S can replace D while providing more robust protection against a pleural attachment.

Lemma 1: For a convex foreground, D has a single local maximum component, and for every d, C(d) is convex.

Lemma 2: For a convex foreground, S has a single local maximum component, whose position is identical to the local maximum of D. Furthermore, with a sufficiently small δ, x is a local maximum of S if x is a local maximum of D.

Lemma 3: For a spherical nodule, its center remains a local maximum of S under any degree of partial occlusion by a half plane.

The first lemma justifies segmenting a nodule by delineating every level set around the local maximum. The second lemma indicates that S can be used instead of D to locate the core of a nodule. The third lemma suggests that the local maximum of S is more stable against partial occlusion by the half plane than that of D.

FIGS. 3(a)-(e) compares the distance D and sphericity S of a sphere under various degrees of occlusion by a half plane. The radius of the sphere is 100 voxels. The top row shows instances of D and the bottom row shows instances of S. For computational simplicity, N(x) is set as a 3×3×3 cube instead of a sphere. From left to right, columns (a)-(e) show a solid plane 31 penetrating the sphere at (a) 30 voxels above, (b) 0 voxel above, (c) 30 voxels below, (d) 60 voxels below, and (e) 90 voxels below the sphere center, respectively. When the plane penetrates at or below the center, the local maximum of D shifts to inside the wall while the local maximum of S retains its position regardless of the degree of partial occlusion. Although Lemma 3 is limited to a sphere, robustness of S in detecting the nodule center has been observed for other more general shapes.

Note that the sphericity value at the nodule center is 1 regardless of the size of the nodule when N(x) is completely contained inside the nodule. With the setting of 3×3×3 voxels for N(x), this implies that the sphericity value is invariant to a nodule size no smaller than 3×3×3 voxels.

To locate a nodule center, compute S and locate a local maximum of S in a neighborhood of the click point. In experiments, the neighborhood was a 7×7×7 sub-volume centered at the click point. FIG. 2 shows sphericity maps and seed points resulting from applying the above procedure to 23 LIDC data sets. The middle image in each set of five images is the axial slice of S at the detected seed point. The seed point is shown by a black cross 21. For clarity, only two black crosses are indicated.

Region Growing

Once the core of a nodule is located, the next task is to extract the nodule from the foreground. Region growing on D is applied starting from the detected seed point and incrementally including each adjacent layer to the growing region. An approach according to an embodiment of the invention can be implemented in the following exemplary, non-limiting algorithm. Note that R denotes a resulting segmentation map, which is initialized to constant zero.

---
Algorithm 1: Region-growing algorithm
Input: D: Distance map, s: seed point
Output: R: Segmentation map
Initialize R to 0
d ← D(s)
while d>0 do
    foreach z that is adjacent to the current region D(s) in R do
        if D(z)=d then
            R(z) ← 1;
    decrement d to the next possible distance value
---

The approach is justified by Lemma 1. For a convex isolated nodule, there is a single local maximum component, from which each adjacent layer can be included into the region incrementally. For a non-isolated nodule, the foreground may not be convex. As illustrated by Lemma 3, the nodule center can be located by the local maximum of S, and one can extract the nodule core using Algorithm 1. However, at some point of d, C(d) becomes non-convex. Including the entire C(d) into the region results in significant over-segmentation. By approaching the inclusion of each adjacent layer in a region growing manner, by including only a single layer around the current region into the region, one can limit the over-segmentation.

FIGS. 4(a) and 4(d) show results of a region growing algorithm according to an embodiment of the invention applied to two artificial data which illustrate juxtapleural and vascularized cases. In both cases, the nodule is a sphere, and the foreground is non-convex due to the attached structure. The black, gray, and white regions are ¬L, L and ¬R, and R, respectively. Although an algorithm according to an embodiment of the invention successfully segmented the entire nodule, it also included a portion of the attached structure near the nodule. The next step removes the over-segmented portion.

Region Partition

This stage removes over-segmented parts of the region-growing segmentation. The task is treated as follows. The region growing segmentation yields multiple convex regions, among which the one including the seed point is the nodule of interest. Thus, it is desired to isolate the nodule from other convex regions. One follows the same strategy as with a region growing algorithm of an embodiment of the invention, as each convex part has a local maximum of D and a convex core around it. One needs to compute a new D using R, denoted as $\tilde{D}$. Since R is already isolated from a pleural wall, it is not necessary to compute S and find its local maxima, as $\tilde{D}$ and its local maxima are sufficient.

The local maxima in $\tilde{D}$ are treated as a new set of seed points, which are either positive or negative. The positive seed points are in the vicinity of the original seed point and contribute toward delineating the nodule part. The negative seed points are those that are not positive, and contribute toward delineating non-nodule components. The following steps can select positive seed points. First, the location of the original seed point is moved to the local maximum of $\tilde{D}$ by tracing the gradient of $\tilde{D}$. Call this relocated seed point $\tilde{s}$. Then, those local maxima of $\tilde{D}$ that are within $\tilde{D}(\tilde{s})$ away from $\tilde{s}$ are classified as positive.

Once one has collected both positive and negative seed points, perform a region growing on $\tilde{D}$ from each seed point in down-hill directions. A region grown from a positive seed point is marked as a nodule, while a region grown from a negative seed point is marked as a non-nodule. The process continues until no further growth is possible. The following exemplary, non-limiting pseudocode for Algorithm 2 summarizes the process. P denotes the result, which is initialized to constant zero.

---
Algorithm 2: Region-partition algorithm
Input: $\tilde{D}$: distance map, $s^+$: positive seed points, $s^-$: negative seed points
Output: P: Partition map
$P(s^+)=1$; $P(s^-)=-1$;
repeat
    foreach x in {z | P(z) = 0} do
        if x has a positive neighbor y and $\tilde{D}(x) \leq \tilde{D}(y)$ then
            P(x)=1;
        if x has a negative neighbor y and $\tilde{D}(x) \leq \tilde{D}(y)$ then
            P(x)=-1;
until No change to P ;
Set all negative voxels in P to 0;
---

Results of a region-partition algorithm according to an embodiment of the invention applied to the artificial data of FIGS. 4(a) and (d) are shown in FIGS. 4(b) and (e), respectively, in which black, gray, and white regions are ¬R, R and ¬P, and P, respectively In both examples, most of the nodule is included in P while non-nodule components are successfully eliminated.

Post-Processing

Segmentation after a region-partition algorithm according to an embodiment of the invention is not necessarily convex. At this final stage, P is first made convex by the convex hull of P, and then its intersection with L is computed. FIGS. 4(c) and 4(f) show results of this stage applied to the artificial data of FIGS. 4(a) and 4(d). The region segmented after this stage is known as region F.

A flowchart that summarizes a method for lung nodule density differentiation is shown in FIG. 5. Given a region of interest (ROI) Ω extracted from an image, a method begins at step 50 by applying a bi-class segmentation algorithm to the ROI to separate the figure from the background, resulting in a binary map L. At step 51, a distance map D is computed for each location in L, which is the shortest Euclidean distance to the background. At step 52, a sphericity S, defined as $$S(x) = \int_{y \in N(x)} \chi(D(x) - D(y)) dy,$$

is calculated from the distance map D, where N(x) is a ball of radius δ centered at x and λ(x)=1 if x>0 and 0 otherwise. A first seed is determined from a local maximum of S at step 53. At step 54, a first region R is grown by adding successive adjacent layers of points to seed point until a background point is reached. A new distance map is computed from R at step 55, which is denoted as $\tilde{D}$. A new seed point $\tilde{s}$ is determined at step 56 by relocating the original seed point to a local maximum of $\tilde{D}$ by tracing the gradient of $\tilde{D}$. At step 57, those local maxima of $\tilde{D}$ that are within $\tilde{D}(\tilde{s})$ away from $\tilde{s}$ are classified as positive, the other local maxima are classified as negative. At step 58, another region growing is performed on $\tilde{D}$ from each seed point in down-hill directions. A region grown from a positive seed point is marked as a nodule, while a region grown from a negative seed point is marked as a non-nodule. The region growing process continues until no further growth is possible. The nodule is made convex at step 59 by finding its convex hull, and then computing its intersection with L.

Experiments

LIDC Segmentation

First, a segmentation algorithm according to an embodiment of the invention was applied to the LIDC data set. The study came from two cancer cases with collected segmentation performed by six radiologists using three methods: one fully manual and two with automated programs. Thus, it collected a total of 18 segmentation maps. A sub-volume of 81×81×L voxels is extracted around the nodule where L is the number of slices in the data set. A click point is set at the center of the sub-volume. Two different segmentation maps are also derived from the manual segmentation. One is a set of voxels included in at least one out of 18 methods. The other is a set of voxels included in 90% of the methods. The former is denoted as $G_1$ and the latter $G_2$.

FIG. 2 shows the result of a segmentation for each LIDC nodule. As stated in above, each nodule corresponds to a set of horizontally aligned five images where the first is a representative axial slice of the original sub-volume, the second shows L at the slice, the third shows S and s. The fourth image shows F super-imposed on top of the original sub-volume. The fifth is made by first painting $G_1$ in dark gray, then painting $G_2$ in light gray, and finally painting the boundary of F in white. Shown to the left of the image set are three numbers, which are, from top to the bottom, a unique data identification number (in bold), the under-segmentation fraction ($p_U$) and over-segmentation fraction ($p_O$). The under/over segmentation fraction percentages are defined as $P_U=100|\neg F \cap G_2||G_2|^{-1}$ and $p_O=100|F \cap \neg G_1||G_1|^{-1}$, respectively, where $\|$ is the cardinality of the set.

Automated Diameter Measurement

A segmentation algorithm according to an embodiment of the invention was applied to a larger set of CT data. Since it is challenging to obtain a reliable segmentation on a large set of data, the diameter of a nodule is used to test the accuracy of the segmentation. The test data includes 1521 nodules from 253 cases, where 1237 are solid, 206 are non-solid, and 77 are part-solid. Each sub-volume after isotropic resampling is 41×41×41 voxels. An ELCAP protocol, originally described at http://www.ielcap.org/ielcap.pdf, is used to measure the nodule diameter both manually and automatically from the segmentation obtained by an algorithm according to an embodiment of the invention.

FIGS. 6(*a*)-(*b*) illustrate diameter measurement results on the 1521 nodule data. FIG. 6(*a*) shows a scatter plot of the manual and automated diameter measurements. The horizontal axis is the manual diameter measurement and the vertical axis is the automated diameter measurement. FIG. 6(*b*) shows a histogram of normalized errors ($\bar{\epsilon}$) defined as $\bar{\epsilon}=|D_m-D_a||D_m|^{-1}$, where $D_m$ and $D_a$ are manual and automated diameter measurements, respectively. The table of FIG. 7 shows descriptive statistics of the estimates. The columns are, from left to right, the data set, the Pearson correlation coefficient, the mean normalized absolute error, the median normalized absolute error, the standard normalized absolute error, and the mean computation time (sec) on a 2.8 GHz PC with 1 G memory.

System Implementation

It is to be understood that embodiments of the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 8:
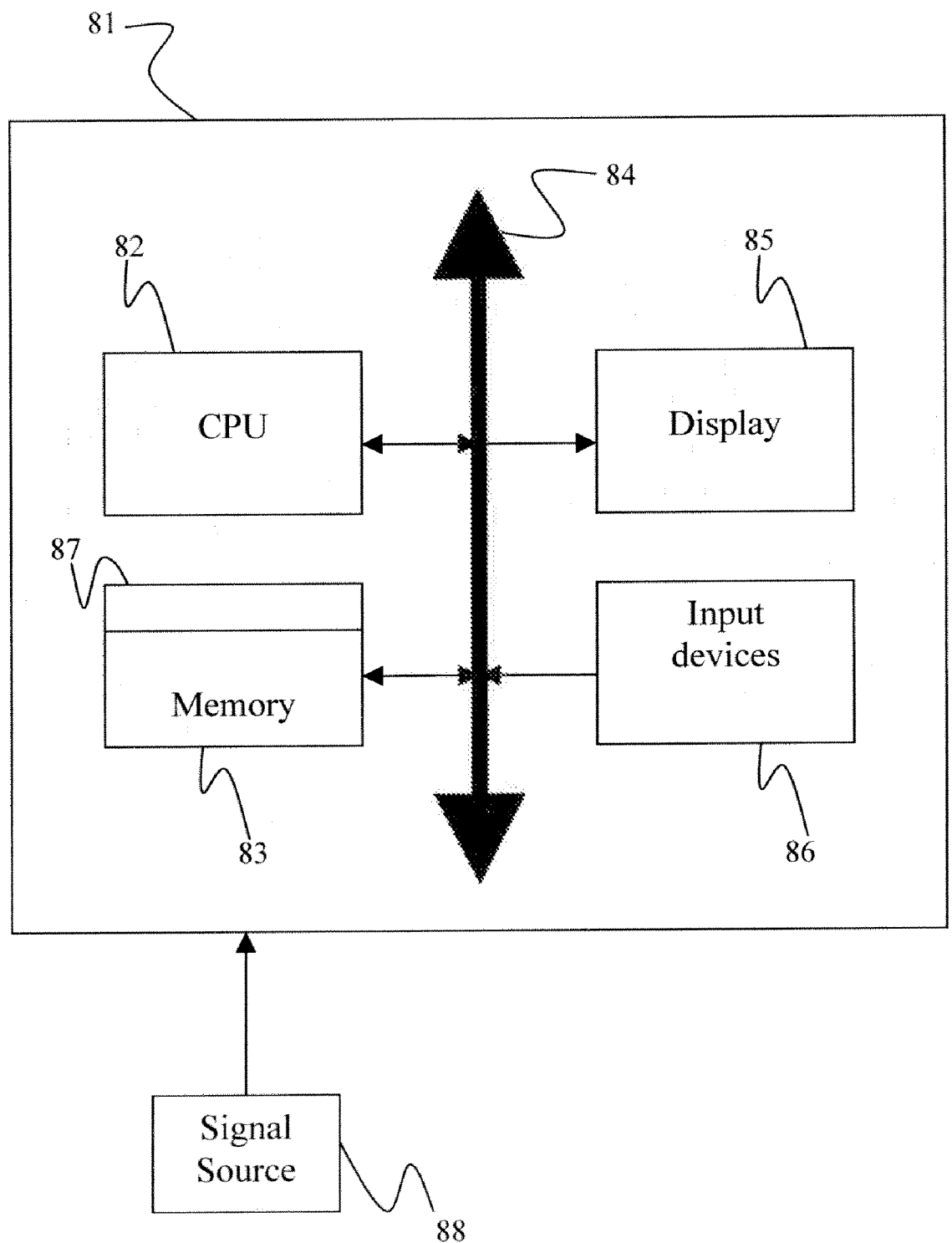
FIG. 8 is a block diagram of an exemplary computer system for implementing a method for lung nodule density differentiation, according to an embodiment of the invention.

FIG. 8 is a block diagram of an exemplary computer system for implementing a method for lung nodule density differentiation according to an embodiment of the invention. Referring now to FIG. 8, a computer system 81 for implementing the present invention can comprise, inter alia, a central processing unit (CPU) 82, a memory 83 and an input output (I/O) interface 84. The computer system 81 is generally coupled through the I/O interface 84 to a display 85 and various input devices 86 such as a mouse and a keyboard. The support circuits can include circuits such as cache, power supplies, clock circuits, and a communication bus. The memory 83 can include random access memory (RAM), read only memory (ROM), disk drive, tape drive, etc., or a combinations thereof. The present invention can be implemented as a routine 87 that is stored in memory 83 and executed by the CPU 82 to process the signal from the signal source 88. As such, the computer system 81 is a general purpose computer system that becomes a specific purpose computer system when executing the routine 87 of the present invention.

The computer system 81 also includes an operating system and micro instruction code. The various processes and functions described herein can either be part of the micro instruction code or part of the application program (or combination thereof which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to a preferred embodiment, those skilled in the art will appreciate that various modifications and substitutions can be made thereto without departing from the spirit and scope of the invention as set forth in the appended claims.

What is claimed is:

1. A method for differentiating pulmonary nodules in digitized medical images comprising the steps of:
    identifying an object of interest from a digital image of the lungs;
    computing a first distance map of each point of said object of interest;
    determining a seed point from said first distance map;
    starting from said seed point, growing a first region by adding successive adjacent layers of points until a background point is reached; and
    partitioning said first region into a nodule region and a non-nodule region, including growing a second region using the first region and identifying the second region as a nodule or a non-nodule region.

2. The method of claim 1, wherein computing a first distance map comprises producing a binary map from said digital image wherein points in a foreground of said object of interest have value 1 and all other points have value 0, and determining a distance from each said foreground point to a nearest background point.

3. The method of claim 1, wherein determining the seed point from said first distance map comprises calculating a sphericity of each point in said first distance map, and selecting as said seed point a local maximum point of said sphericity, wherein said sphericity at a point x is defined as $$S(x) = \int_{y \in N(x)} \lambda(D(x) - D(y)) dy,$$

wherein D(x) is the first distance map for point x, N(x) is a ball of radius δ centered at x and λ(x)=1 if x>0 and 0 otherwise.

4. The method of claim 1, further comprising resampling said object of interest at a fixed interval to produce an isotropic sub-volume.

5. The method of claim 1, wherein partitioning said first region comprises:
    computing a second distance map of each point in said first region;
    relocating said seed point to a local maximum of said second distance map, and finding all local maxima about said relocated seed point; and
    growing the second region about each local maxima in a down-hill direction.

6. The method of claim 5, wherein those local maxima within a predetermined distance of said relocated seed point are labeled as positive, and all other local maxima are labeled negative, wherein those points attached to a second region grown from a positive local maximum are labeled as positive, those points attached to a second region grown from a negative local maximum are labeled as negative, said second region is grown until all points in said second distance map are labeled as positive or negative, and wherein each set of positive points is identified as a nodule, and each set of negative points is identified as a non-nodule.

7. The method of claim 1, further comprising forming a convex hull of said nodule, and calculating an intersection of said convex hull with a foreground of said object of interest.

8. A method for differentiating pulmonary nodules in digitized medical images comprising the steps of:
    growing a first region about a seed point in an object of interest in a digital medical image;
    determining a second seed point in said first region, and finding all local maxima about said second seed point;
    labeling those local maxima within a predetermined distance of said second seed point as positive, and labeling all other local maxima as negative;
    growing a second region about each local maxima in a down-hill direction, wherein those points attached to a second region grown from a positive local maximum are labeled as positive, those points attached to a second region grown from a negative local maximum are labeled as negative, said second region is grown until all points in said first region are labeled as positive or negative; and
    identifying each set of positive points as a nodule, and each set of negative points as a non-nodule.

9. The method of claim 8, wherein growing a first region comprises identifying a object of interest in said digital image of the lungs;
    determining a first seed point in said object of interest; and
    starting from said first seed point, growing a first region by adding successive adjacent layers of points until a point outside of said object of interest is reached.

10. The method of claim 9, wherein determining a first seed point comprises:
    producing a binary map from said digital image wherein points in a foreground of said object of interest have value 1 and all other points have value 0;
    determining a distance from each said foreground point to a nearest background point;
    calculating a sphericity of each point in said first distance map, wherein said sphericity at a point x is defined as $$S(x) = \int_{y \in N(x)} \lambda(D(x) - D(y)) dy,$$

wherein D(x) is the first distance map for point x, N(x) is a ball of radius δ centered at x and λ(x)=1 if x>0 and 0 otherwise; and
    selecting as said seed point a local maximum point of said sphericity.

11. The method of claim 8, wherein determining a second seed point comprises computing a second distance map of each point in said first region and relocating said seed point to a local maximum of said second distance map by tracing a gradient of said second distance map.

12. The method of claim 11, wherein said second region is grown until all points in second distance map are labeled as positive or negative.

13. The method of claim 11, wherein a point x attached to said second region has a neighbor point y with a same label and wherein a second distance map value of x is less than or equal to a second distance map value of y.

14. A program storage device readable by a computer, tangibly embodying a program of instructions executable by the computer to perform the method steps for differentiating pulmonary nodules in digitized medical images, said method comprising the steps of:
    identifying an object of interest from a digital image of the lungs;
    computing a first distance map of each point of said object of interest;
    determining a seed point from said first distance map;

starting from said seed point, growing a first region by adding successive adjacent layers of points until a background point is reached; and partitioning said first region into a nodule region and a non-nodule region, including growing a second region using the first region and identifying the second region as a nodule or a non-nodule region.

15. The computer readable program storage device of claim 14, wherein computing a first distance map comprises producing a binary map from said digital image wherein points in a foreground of said object of interest have value 1 and all other points have value 0, and determining a distance from each said foreground point to a nearest background point.

16. The computer readable program storage device of claim 14, wherein determining the seed point from said first distance map comprises calculating a sphericity of each point in said first distance map, and selecting as said seed point a local maximum point of said sphericity, wherein said sphericity at a point x is defined as $$S(x) = \int_{y \in N(x)} \lambda(D(x) - D(y)) dy,$$

wherein D(x) is the first distance map for point x, N(x) is a ball of radius δ centered at x and λ(x)=1 if x>0 and 0 otherwise.

17. The computer readable program storage device of claim 14, the method further comprising resampling said object of interest at a fixed interval to produce an isotropic sub-volume.

18. The computer readable program storage device of claim 14, wherein partitioning said first region comprises:
computing a second distance map of each point in said first region;
relocating said seed point to a local maximum of said second distance map, and finding all local maxima about said relocated seed point; and
growing the second region about each local maxima in a down-hill direction.

19. The computer readable program storage device of claim 18, wherein those local maxima within a predetermined distance of said relocated seed point are labeled as positive, and all other local maxima are labeled negative, wherein those points attached to a second region grown from a positive local maximum are labeled as positive, those points attached to a second region grown from a negative local maximum are labeled as negative, said second region is grown until all points in said second distance map are labeled as positive or negative, and wherein each set of positive points is identified as a nodules and each set of negative points is identified as a non-nodule.

20. The computer readable program storage device of claim 14, the method further comprising forming a convex hull of said nodule, and calculating an intersection of said convex hull with a foreground of said object of interest.

* * * * *